United States Patent [19]

Goldstein

[11] Patent Number: 5,317,594
[45] Date of Patent: May 31, 1994

[54] SYSTEMS FOR AND METHOD OF IDENTIFYING V.FAST MODEM WITHIN EXISTING AUTOMATIC INTERWORKING PROCEDURE STANDARDS

[75] Inventor: Yuri Goldstein, Southbury, Conn.

[73] Assignee: General DataComm, Inc., Middlebury, Conn.

[21] Appl. No.: 819,277

[22] Filed: Jan. 13, 1992

[51] Int. Cl.$^5$ .......................... H04B 1/38; H04L 5/16
[52] U.S. Cl. ........................................ 375/8; 375/121
[58] Field of Search .................. 379/93, 97, 98; 375/7, 375/8, 9, 121

[56] References Cited

U.S. PATENT DOCUMENTS

| | | | |
|---|---|---|---|
| 4,756,007 | 7/1988 | Qureshi et al. | 379/93 |
| 4,931,250 | 6/1990 | Greszczuk | 375/121 |
| 4,956,851 | 9/1990 | Wolensky et al. | 375/8 |
| 5,148,472 | 9/1992 | Hallman | 375/8 |

*Primary Examiner*—Stephen Chin
*Assistant Examiner*—Hai H. Phan
*Attorney, Agent, or Firm*—David P. Gordon

[57] ABSTRACT

A method for identifying a V.fast modem within already standard automatic interworking procedures are provided. The method comprises utilizing standard methods for identifying a V.32/V.32bis modem up and through the standard ranging sequence, and after ranging and during the undefined 8192 baud period before an S signal would be sent by a V.32 or V.32bis modem the answering mode modem sends a predetermined signal (VFS) which does not resemble an S signal. Simultaneous with the answer modem sending VFS, the call mode modem looks for VFS. Upon detecting VFS, the call mode modem confirms receipt by sending a confirming signal (VFC) to the answer mode modem. Upon receiving VFC, if the communicating modems are not already in a problem mode, the modems will probe the line and continue according to whatever V.fast standards will be adopted. Preferably, VFS contains at least two tones. If desired, VFS can be a spectrum, with energy in frequency bands surrounding the S tone frequencies suppressed. This way, the VFS signal can be used by the answering modem for probing the line. Similarly, the confirming signal may be one or more tones, or a spectrum of frequencies for probing.

20 Claims, 4 Drawing Sheets

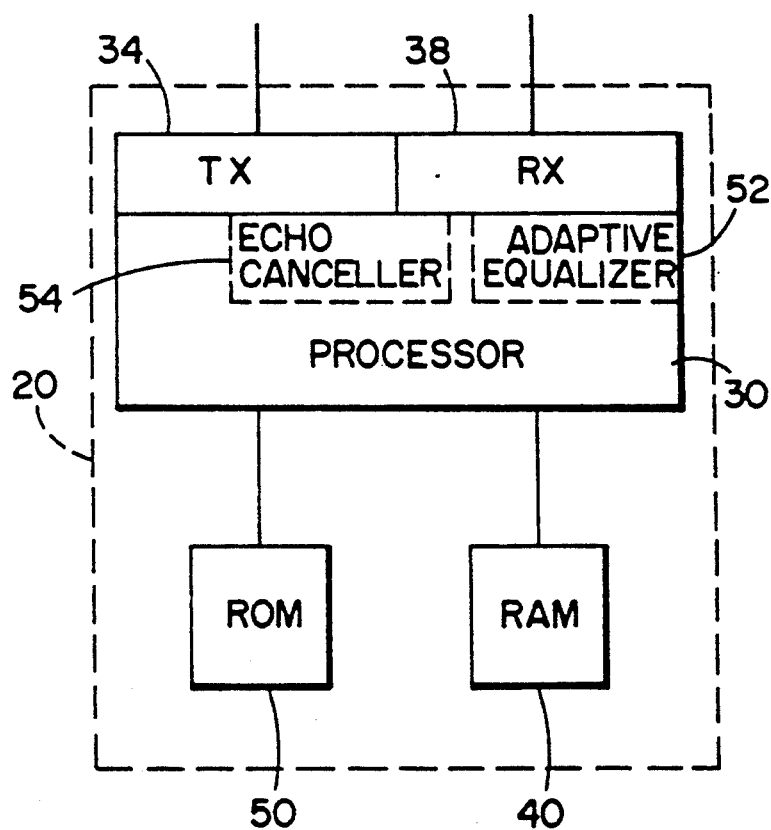

SYSTEMS FOR AND METHOD OF IDENTIFYING V.FAST MODEM WITHIN EXISTING AUTOMATIC INTERWORKING PROCEDURE STANDARDS

BACKGROUND OF THE INVENTION

This invention relates generally to handshake procedures of modems. The invention more particularly relates to procedures for automatic interworking between different modems.

As modems having different capabilities, including higher transmission rates, have been developed, it has been a desire in the industry to maintain "backwards compatibility". Backwards compatibility ensures that the newer modems are able to communicate with the modems already in the field. It also enables modems with increased capabilities to reduce the use of their capabilities and/or their transmission rates should the line over which the modems are communicating be incapable of permitting full utilization of those capabilities.

In order to accommodate backwards compatibility between modems, industry standards governing the communication between modems have been proposed and adopted. A good recent example of such a standard is an EIA/TIA Draft Standard PN2330 (Apr. 9, 1991) entitled "Procedures for Automatic Interworking between Automode Modems and V.32bis, V.32, V.22bis, V.22, V.21, V.23, 212-type and 103-type Modems", which document is hereby incorporated by reference herein in its entirety. Document PN2330 is provided to assist manufactures in the design of modems which can interwork with a variety of other modems adhering to different modulation standards. The standard is based on techniques presented in the CCITT recommendation V.32 Annex A, which is also hereby incorporated by reference herein in its entirety. The standard specifies a procedure for a modem to automatically detect the modulation technique and data signaling rate of the modem with which it is connected. When incorporated into a new modem which has the capability of using multiple modulation techniques, the specified procedure allows for automatic interoperation. The modulation techniques and data signaling rates of CCITT Recommendations V.32bis, V.32, V.22bis, V.21, V.23, and 212-type and 103-type modems (all of which are hereby incorporated by reference herein in their entireties) are addressed in the standard. However, it is of significant note that the modulation techniques and data signaling rates of V.fast modems, the standards of which are just now being formulated, are not addressed in the EIA/TIA PN-2330 standard. In fact, it is expected by those skilled in the art that the V.fast modems will add significant complications to the procedures for automatic interworking and may require an entire reworking of the draft a standards.

SUMMARY OF THE INVENTION

It is therefore an object of the invention to provide methods and apparatus for the automatic interworking and identification of V.fast type modems.

It is another object of the invention to provide methods and apparatus for identifying V.fast type modems within the existing PN-2330 standard procedures for automatic interworking of modems.

In accord with the objects of the invention, a method for identifying a V.fast modem comprises utilizing standard methods for identifying a V.32/V.32bis modem up and through the standard ranging sequence, and after ranging and during the undefined 8192 baud period before an S signal would be sent by a V.32 or V.32bis modem the answering mode modem sends a predetermined signal which does not resemble an S signal (an S signal being comprised of three tones at 600, 1800 and 3000 Hz). Preferably, the predetermined signal contains at least two tones (so as to avoid conflicting with some manufacturers' uses of one tone for various purposes after ranging), and preferably at least three or more tones. In fact, a spectrum can be sent by the answering modem which can be used for probing the line providing the energy in bands (e.g. 200 Hz bands) surrounding the S tone frequencies is substantially suppressed. Simultaneous with the answering modem sending the predetermined signal, the call mode modem looks for the predetermined signal. Upon detecting the predetermined signal, the call mode modem confirms receipt of the predetermined signal by sending a confirming signal to the answer mode modem. The confirming signal may be one or more tones, a spectrum of frequencies for probing, etc. Upon receiving the confirmation signal, if the communicating modems are not already in a probing mode, the modems will probe the line and continue according to whatever V.fast standards will be adopted.

With the provided arrangement for determining the presence of a V.fast modem, it will be appreciated that if the call mode modem is not a V.fast modem, but rather is a V.32 or V.32bis type modem, when the answer mode V.fast type modem sends the predetermined signal, the call mode modem will ignore that signal and will wait for the S signal. Thus, if within the undefined 8192 baud period following the sixteen baud silence period which follows the AC/CA/AC signal sequence, the answer mode modem does not receive the confirming signal from the call mode modem, it will determine that the call mode modem is not a V.fast modem but is a V.32 or V.32bis type modem and will continue with the V.32/V.32bis handshake according to known standards. Thus, the V.fast modem will be compatible with the V.32/V.32bis standards. On the other hand, if the call mode modem is a V.fast modem but the answer mode modem is a V.32 or V.32bis modem, the predetermined signal will never be sent from the answer mode modem to the call mode modem. Thus, the call mode modem will continue as a V.32/V.32bis type modem and will continue the V.32/V.32bis handshake according to known standards.

Additional objects and advantages of the invention will become apparent to those skilled in the art upon reference to the detailed description taken in conjunction with the provided figures.

BRIEF DESCRIPTION OF THE DRAWINGS compatible modems;

FIG. 3 is a high level block diagram of the V.fast modem which conducts the preferred handshake of the invention.

DETAILED DESCRIPTION OF THE PREFERRED EMBODIMENTS

Figure 1:
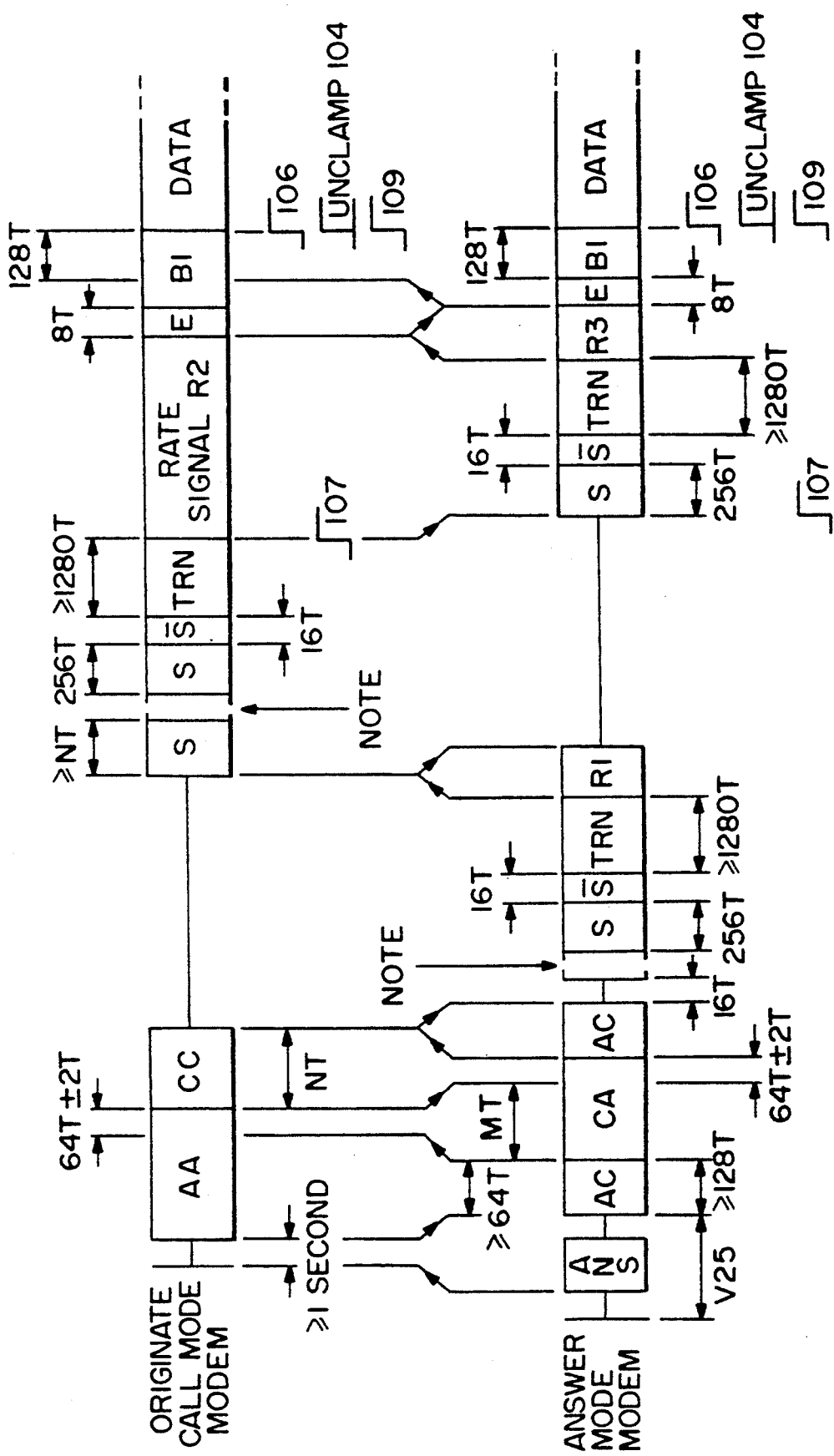

As mentioned in the Background section hereof, procedures have been established for the automatic interworking between automode modems and V.32bis, V.32, V.22bis, V.22, V.21, V.23, 212-type and 103-type modems. As set forth in Document PN2330 previously incorporated by reference herein, on connection to the line, the calling automode modem initially remains silent or optionally transmits a calling tone in accordance with the procedures specified in CCITT recommendation V.25 Section 3. The receiver of the calling automode modem is conditioned to detect any of the following signals: 1300 Hz, 1650 Hz, AC, USB1, 2225 Hz, or ANS. If a 1300 Hz tone is detected, the automode modem begins transmitting a 390 Hz low channel FSK mark tone as per the V.23 recommendations. If a 1650 Hz signal is detected, the automode modem begins transmitting a 980 Hz low channel FSK mark tone as per the V.21 recommendations. If an AC signal is detected, the automode modem begins transmitting an AA signal and then proceeds with the start-up procedures specified in CCITT Recommendation V.32bis, paragraph 6.1. If a USB1 or 2225 Hz signal is detected, the automode modem sets a timer to a value greater than 3100 ms. If USB1 or the 2225 Hz tone is still present when the timer expires, the automode modem proceeds with the interworking procedures specified in CCITT Recommendation V.22bis, paragraph 6.3.1.1. If, however, after a time of 1070±50 ms the modem has not detected signal S or signal SB1 (see CCITT Recommendation V.22ibs, paragraph 6.3.1.1c), the modem stops transmitting SB1 and begins transmitting the 1270 Hz low channel FSK mark tone as used by 103-type modems. If signal AC is detected prior to the expiration of the timer, the automode modem proceeds with the start-up procedures specified in CCITT Recommendation V.32bis, paragaraph 6.1. If signal ANS is detected for a period of at least one second, the automode modem sends signal AA, starts a timer and conditions its receiver to detect any of the following signals: 1300 Hz, 1650 Hz, AC, or USB1. The timer is stopped when signal ANS is no longer detected. If detection of signal ANS is for less than one second, the calling modem will not respond. In that case it is necessary to receive an additional signal before the modem can respond.

On the answering automode modem side, upon connection to the line, the answering automode modem transmits an ANS signal in accordance with the procedures specified in CCITT Recommendation V.25 Section 4, and conditions its receiver to detect signal AA. If signal AA is detected during the answer sequence as specified in CCITT recommendation V.25, Section 4, the automode modem proceeds with the start-up procedures specified in CCITT Recommendation V.32bis paragraph 6.2. If signal AA is not detected during the Recommendation V.25 answering sequence, the answering automode modem transmits signal USB1, conditions its receiver to detect, in the low channel, signals S1, SB1 or 1270 Hz, and sets its timer to a value of 3000 ±50 ms. If either signals S1 or SB1 are detected before the timer expires, the automode modem proceeds with the interworking procedures as specified in CCITT Recommendation V.22bis, paragraph 6.3.1.1.2b). If a 1270 Hz signal is detected before the timer expires, the automode modem stops transmitting signal USB1 and begins transmitting the 2225 Hz high-channel FSK mark tone as used by 103-type modems. If the timer expires before signals S1, SB1, or 1270 Hz are detected, the automode modem stops transmitting signal USB1, conditions its receiver to detect signal AA, and begins transmitting signal AC. If signal AA is detected the automode modem proceeds with the start-up procedures specified in CCITT Recommendation V.32bis paragraph 6.2.

After 800 ms without detecting signal AA, the automode modem stops transmitting signal AC, conditions its receiver to detect the 980±12 Hz low band V.21 mark tone, and begins transmitting a 1650 Hz signal. If the mark tone is detected, the automode modem proceeds as per the V.21 Recommendation. After 2000 ms without detecting the V.21 mark tone, the automode modem stops transmitting the 1650 Hz signal, conditions its receiver to detect the 390±12 Hz low-band V.23 mark tone, and begins transmission of a 1300 Hz signal. If the mark tone is detected, the automode modem proceeds per the V.23 Recommendation.

Where the automode modems are V.32 or V.32bis type modems, the standard start-up procedures (i.e. handshakes) beyond the ANS and AC signals of the answering modem, and the AA signal of the calling modem are set forth in "Data Communication Over the Telephone Network - Recommendations of the V Series - Volume VIII - Fascicle VIII.1", CCITT VIIIth Plenary Assembly, MalagaTorremolinosm 8-19 October 1984, which is hereby incorporated by reference herein. As seen in FIG. 4/V.32 of the CCITT Recommendation which is reproduced as the prior art FIG. 1 hereof, the handshake starts when the answering modem sends an answer tone (ANS) of 2100 Hz for one or more seconds. The calling or originating modem, upon receipt of the answer tone sends a 1800 HZ signal (AA), and the answering modem, upon receiving the AA signal responds with an AC signal (600 Hz and 3000 Hz tones), followed by a CA signal (continued tones reversed in phase) followed by another AC signal. Meanwhile, upon detecting the switch from AC to CA, the originating modem switches from signal AA to signal CC. In this manner each modem can measure the round trip delay experienced over the channel and can adjust its echo cancellers appropriately (i.e., the modems conduct their "ranging").

Once the round trip delay has been determined, according to the "Note" included in the V.32 standards, the answering modem may include a special echo canceller training sequence of up to 8192 symbol intervals and which will not imitate the AB (S) or CD (S̄) signal states. Then, the modems continue their handshake. The answerinq modem sends out an S signal for two hundred fifty-six symbol intervals, an S̄ signal for sixteen symbol intervals, a training sequence (TRN) for between 1280 and 8192 symbol intervals, and a repeated sixteen bit rate sequence R1. The training sequence includes a pseudo-random sequence with scrambled ones at 4800 bits/second with dibits encoded directly to states A, B, C, and D according to a predetermined format. The function of the S, S̄ and TRN sequence being sent by the answering modem is to train the adaptive equalizer in the calling modem as well as to train the echo canceller of the answering modem. The sixteen bit rate sequence R1, on the other hand is a 4800 bits/second scrambled and differentially encoded sequence as set forth in Table 1/V.32 which is used to indicate to the calling modem which of several modes the answering modem can support.

Upon receiving the S, S̄, TRN, and R1 sequence, the originating modem essentially repeats the same sequence, except that instead of supplying the R1 signal after the training sequence, the calling modem provides an R2 signal. The R2 signal indicates the common modes between the originating and answering modem, and provisionally chooses a mode. While the R2 signal continues, the answering modem again repeats the S, S̄, TRN, sequence, followed by R3 which finally chooses the mode of communication (e.g. 14,400, 9600, 9600 Trellis encoded, 4800, or 2400 bits/second). The handshake terminates with respective transmissions by the originating and answering modem of an E signal which confirms the mode of communication, and a B1 signal which is comprised of scrambled marks at the agreed upon rate. The handshake terminates and desired data transmission starts immediately after the B1 signal.

Figure 2:
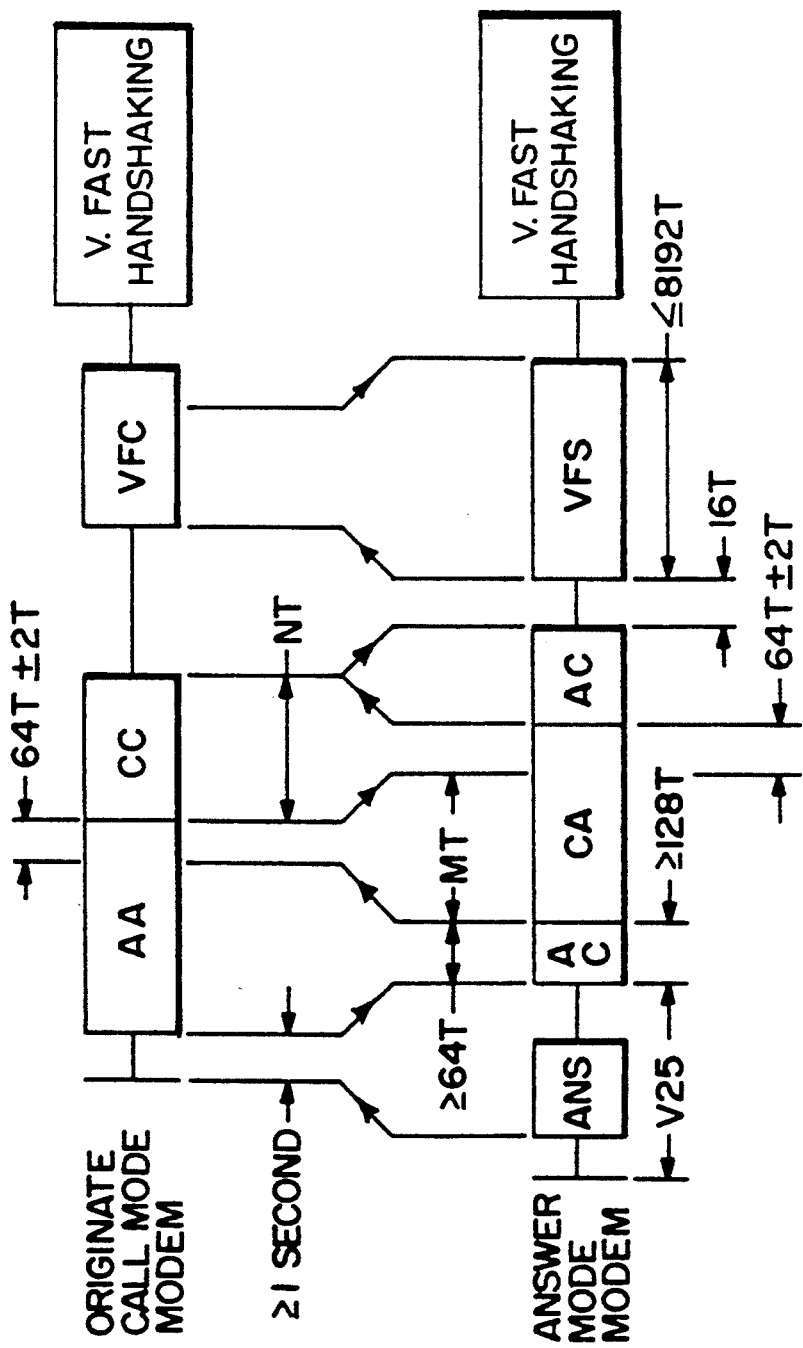
FIG. 2 is a handshake diagram showing a modified V.32/V.32bis handshake incorporating the method invention for identifying V fast modems.

Turning to FIG. 2, and in accord with the preferred embodiment of the invention, the handshake procedure for a V.fast modem is incorporated within the V.32/V.32bis start-up procedure. In particular, upon completion of ranging, and after the sixteen baud silence period, but before the transmitting of signal state S, the V.fast modem sends a predetermined signal (VFS) which does not resemble an S signal (the S signal comprised of three tones at 600, 1800 and 3000 Hz). The predetermined signal preferably contains at least two tones, and more preferably at least three or more tones. Where three tones are sent, it is preferred that the three tones be located at different portions of the spectrum (e.g., 200 Hz, 1200 Hz, and 2400 Hz) and not include be within ±100 Hz of any of the S signal tones. In fact, a spectrum of tones can be sent by the answering modem, which spectrum can be used for probing the line in accord, e.g., with European Patent Application 0,397,535 (Eyuboglu). Again, if a spectrum of tones is sent by the answering modem as the VFS signal, the spectrum should not include the S tone frequencies or frequencies within a band around the S tone frequencies.

Simultaneous with the answering modem sending the predetermined signal VFS, the call mode modem looks for the VFS signal. Upon detecting signal VFS, the call mode modem confirms receipt of the predetermined signal by sending a confirming signal (VFC) to the answer mode modem. The confirming signal may be one or more tones, a spectrum of frequencies for probing, etc. Upon the answering modem receiving the signal VFC, the communicating modems will continue their handshake procedure according to whatever procedures are set forth in whatever V.fast standards that are adopted. Most likely, if signals VFS and VFC do not probe the line, the handshaking will continue with the modems probing the line, etc.

With the provided arrangement for determining the presence of a V.fast modem, it will be appreciated that if the call mode modem is not a V.fast modem, but rather is a V.32 or V.32bis type modem, when the answer mode V.fast type modem sends signal VFS, the call mode modem will ignore that signal and will wait for the S signal. Thus, if within the 8192 baud period, the answer mode modem does not receive the confirming signal VFC from the call mode modem, it will determine that the call mode modem is not a V.fast modem but is a V.32 or V.32bis type modem and will continue with the V.32bis handshake according to FIG. 1. Thus, the V.fast modem will be compatible with the V.32/V.32bis standards. On the other hand, if the call mode modem is a V.fast modem but the answer mode modem is a V.32 or V.32bis modem, the predetermined signal will never be sent from the answer mode modem to the call mode modem. Thus, upon failing to receive the V.fast signal VFS, the call mode modem will continue as a V.32 or V.32bis type modem and will continue the V.32/V.32bis handshake as set forth in FIG. 1.

Turning to FIG. 3, a high-level diagram is seen of a modem 20 with means capable of conducting the preferred V.fast identification procedure as either an originating or answering modem. The V.fast type modem 20 includes a digital signal processor (DSP), microprocessor, or other processor 30 with accompanying transmit circuitry 34, receive circuitry 38, a RAM 40, and a ROM 50. As shown, the DSP 30 implements an adaptive equalizer 52 and an echo canceller 54.

Figure 4A:
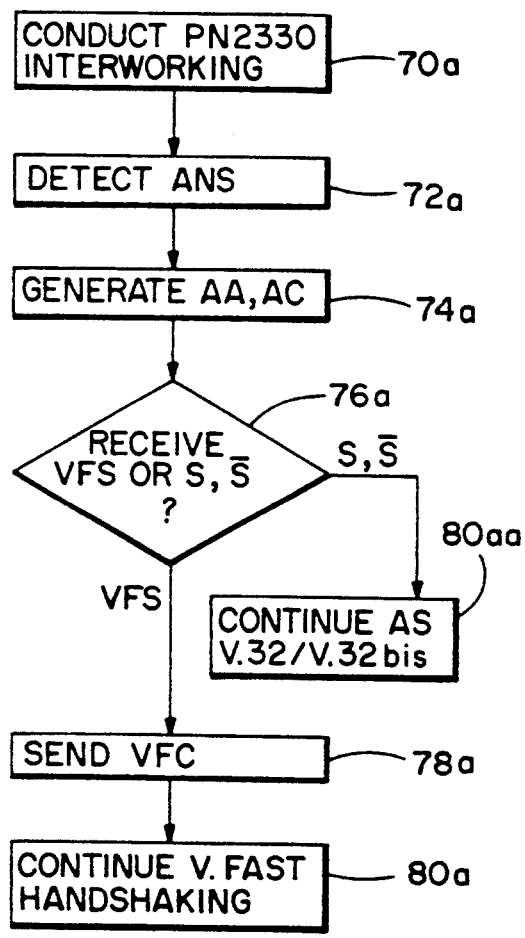
FIGS. 4a and 4b are high level flow charts of means within the V.fast modem of FIG. 3 for conducting the preferred handshake and V.fast identifying method of the invention.
Figure 4B:
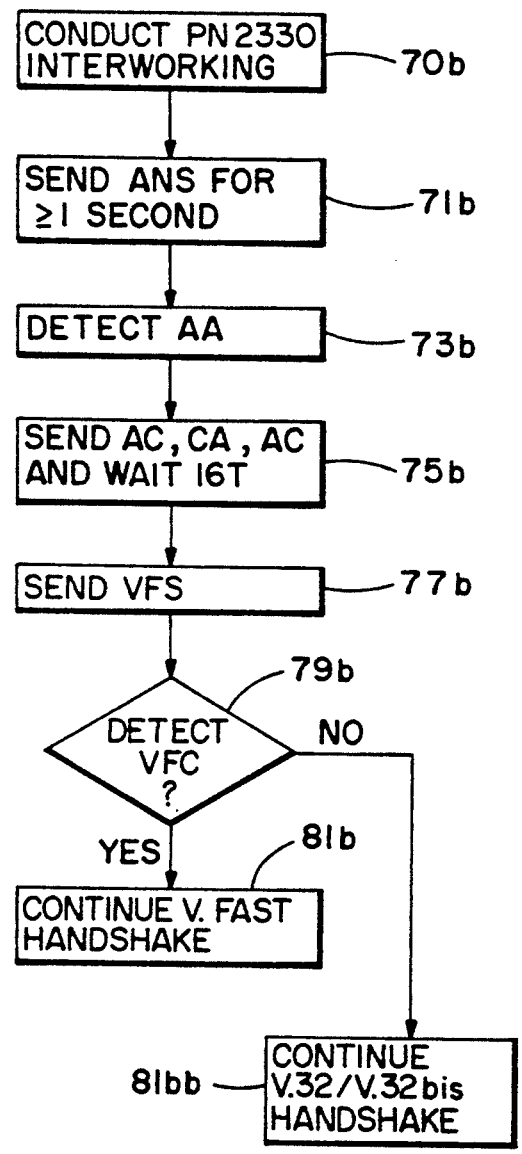

As seen in FIG. 4a and 4b, the DSP 30 of modem 20 is programmed (typically with instructions in ROM 50) to conduct handshake sequences. As an originating modem, the DSP 30 at step 70a of FIG. 4a first steps through the interworking routine of Document PN2330. Then at step 72a, the originating modem waits to receive the ANS signal from the answering modem. Upon detecting the ANS signal for at least one second, at 74a, the originating modem generates an AA signal and then a CC signal (as seen in FIG. 2). The originating modem then waits at 76a to detect either the predetermined VFS signal before signals S and S̄ are detected. If receipt of the VFS signal is detected, the originating modem sends the VFC confirmation signal at 78a and confirmation is obtained that two V.fast modems are communicatinq. The modems then continue the handshake sequence at 80a with probing or with whatever other V.fast handshake sequence is prescribed. On the other hand, if no VFS signal is detected, but the S, S̄ sequence is detected, the originating modem 20 continues at step 80aa in accord with the sequence of FIG. 1 as a V.32 or V.32bis type modem.

As an answering modem, the DSP 30 at step 70b of FIG. 4b first steps through the interworking routine of Document PN2330. Then at step 71b, the answering modem sends the ANS signal to the originating modem. After sending the ANS signal for at least one second, the answering modem conditions itself at step 73b to detect an AA signal being sent from the originating modem. If the AA signal is detected, at 75b, the answering modem generates and sends a sequence of signals AC, CA, and AC as seen in FIG. 2. The answering modem then sends at 77b the predetermined VFS signal and conditions itself to receive the confirmation VFC signal within 8192 symbol intervals after the sixteen baud silence period followinq the termination of the AC siqnal by the answering modem. If the VFC signal is detected by the answering modem at 79b within the prescribed time period, confirmation is obtained that two V.fast modems are communicating, and communication continues at step 81b with probing or with whatever other V.fast handshake sequence is prescribed. On the other hand, if no VFC signal is detected within the prescribed time period, the answering modem continues at step 81bb by sending signals S, S̄, TRN, and R1 in accord with FIG. 1 as a V.32 or V.32bis type modem.

There have been described and illustrated herein methods for identifying V.fast type modems within existing automatic interworking procedure standards, and apparatus for carrying out the methods which relate directly to the methods. While particular embodiments of the invention have been described, it is not intended that the invention be limited thereto, as it is intended that the invention be as broad in scope as the art will allow and that the specification be read likewise. Thus, while particular signals such as three particular tones or a spectrum of tones, were described as preferred predetermined V.fast signals (VFS), other signals can be utilized provided that they do not conflict with any signal that a V.32 or V.32bis type originating modem might recognize. Similarly, while particular V.fast confirmation signals (VFC) were described, it will be appreciated that other confirmation signals could be utilized. For example, preferably, the VFS and VFC signals should be similar, with the VFC signal offset in frequency relative to the VFS signal so as to avoid false detection due to echo. Of course, if a time guard is utilized to avoid echo, the VFS and VFC signals can be identical. Also, while the invention was described as permitting full use of the 8192 baud period following ranging, it will be appreciated that the VFS and VFC signals are preferably sent in just a portion of that time period (e.g., the beginning) so as to allow time for the answering mode modem to conduct echo cancelling before continuing with the S, $\bar{S}$, TRN, R1 sequence in case the call mode modem is not a V.fast type modem. It will therefore be appreciated by those skilled in the art that yet other modifications could be made to the provided invention without deviating from its spirit and scope as so claimed.

I claim:

1. A method for identifying communications between a calling modem and a V.fast compatible answering modem, comprising:
   a) in said calling modem and V.fast compatible answering modem, using standard V.32/V.32bis interworking methods for identifying said calling modem as a V.32/V.32bis modem up and through a first standard V.32/V.32bis ranging sequence;
   b) after an at lest sixteen baud silent time period which occurs after termination of said first standard V.32/V.32bis ranging sequence by said V.fast compatible answering modem, sending a V.fast identification signal from said V.fast compatible answering modem to said calling modem before completion of an 8192 baud time period after said at least sixteen baud silent time period;
   c) detecting said V.fast identification signal at said calling modem;
   d) sending a V.fast confirmation signal from said calling modem to said V.fast compatible answering modem; and
   e) detecting said V.fast confirmation signal at said V.fast compatible answering modem, wherein said V.fast identification signal is substantially different from a V.32/V.32bis S signal and wherein upon said detecting of said V.fast confirmation signal, said V.fast compatible answering modem and said calling modem switch into a V.fast interworking protocol, but if said V.fast confirmation signal is not detected by said V.fast compatible answering modem, said V.fast compatible answering modem and said calling modem continue with said standard V.32/V.32bis interworking methods.

2. A method according to claim 1, wherein:
said V.fast identification signal comprises at least two different tones.

3. A method according to claim 1, wherein:
said V.fast identification signal comprises at least three different tones.

4. A method according to claim 3, wherein:
said V.fast identification signal comprises a spectrum of different tones, wherein said spectrum of different tones has suppressed energy in bands surrounding 600 Hz, 1800 Hz, and 3000 Hz.

5. A method according to claim 4, wherein said calling modem and said V.fast comatible answering modem are communicating over a line, and wherein:
said different tones of said spectrum of different tones are chosen to permit probing of said line over which said calling modem and said V.fast compatible answering modem are communicating.

6. A method according to claim 1, wherein:
said sending a V.fast identification signal from said V.fast compatible answering modem to said calling mode, detecting said V.fast identification signal at said calling modem, sending a V.fast confirmation signal from said calling modem to said V.fast compatible answering modem, and detecting said V.fast confirmation signal at said V.fast compatible answering modem is conducted in a portion of said 8192 baud time period.

7. A method according to claim 6, wherein:
said portion of said 8192 baud time period is a beginning portion of said 8192 baud time period.

8. A method according to claim 1, wherein:
said V.fast identification signal comprises at least one tone, said V.fast confirmation signal comprises at least one tone, and each tone of said V.fast confirmation signal is substantially different than each tone of said V.fast identification signal.

9. A method according to claim 8, wherein:
said V.fast identification signal and said V.fast confirmation signal each comprises a spectrum of different tones, wherein each of said spectrum of different tones has suppressed energy in bands surrounding 600 Hz, 1800 Hz, and 3000 Hz.

10. A method according to claim 2, wherein said calling modem and said V.fast compatible answering modem are communicating over a line, and further comprising:
   c) after detecting said V.fast confirmation signal at said V.fast compatible answering modem, probing said line with said answering modem and said calling modem.

11. A system for identifying and confirming communications between a calling modem and an answering modem, comprising:
   in said answering modem,
   means for using standard V.32/V.32bis interworking methods for identifying said calling modem as a V.32/V.32bis modem up and through a first standard V.32/V.32bis ranging sequence, and means for sending a V.fast identification signal to said calling modem after an at least sixteen baud silent time period which occurs after termination of said first standard V.32/V.32bis ranging sequence and before completion of an 8192 baud time period after said sixteen baud silent time period, wherein said V.fast identification signal is substantially different from a V.32/V.32bis S signal, and for detecting a V.fast confirmation signal; and
   in said calling modem,
   means for using said standard V.32/V.32bis interworking methods for identifying said answering modem as a V.32/V.32bis modem up and through a first standard v.32/V.32bis ranging sequence, and means for detecting said V.fast identification signal and for sending said V.fast confirmation signal to said answering modem in said 8192 baud time period after said sixteen baud silent time period; and wherein upon detection of said V.fast confirmation signal, said answering modem and said calling modem switch into a V.fast interworking protocol, but if said V.fast confirmation signal is not detected by said answering modem, then said answering modem and said calling modem continue with said standard V.32/V.32bis interworking methods.

12. A system according to claim 11, wherein:
said means for sending a V.fast identification signal in said answering modem comprises means for generating at least two different tones representing said V.fast identification signal.

13. A system according to claim 11, wherein:
said means for sending a V.fast identification signal in said answering modem comprises means for generating at least three different tones representing said V.fast identification signal.

14. A system according to claim 13, wherein:
said means for generating at least three different tones comprises means for generating a spectrum of different tones, wherein said spectrum of tones has suppressed energy in bands surrounding 600 Hz, 1800 Hz, and 3000 Hz.

15. A system according to claim 14, wherein said calling modem and said answering modem are communicating over a line, and said system further comprises:
in said answering modem, a first line probing means coupled to said line, and
in said calling modem, a second line probing means coupled to said line.

16. A system according to claim 11, wherein:
said means for sending a V.fast identification signal from said answering modem to said calling modem sends said identification signal in a first portion of said 8192 baud time period and said means for sending a V.fast confirmation signal from said calling modem to said answering modem sends said V.fast confirmation signal in a second portion of said 8192 baud time period.

17. A system according to claim 16, wherein: said first and second portions of said 8192 baud time period are at a beginning portion of said 8192 baud time period.

18. A system according to claim 11, wherein:
said means for sending a V.fast identification signal in said answering modem comprises a first means for generating at least one tone,
said means for sending a V.fast confirmation signal in said calling modem comprises second means for generating at least one tone, wherein each tone of said V.fast confirmation signal is substantially different than each tone of said V.fast identification signal.

19. A system according to claim 18, wherein:
said first means and said second means for generating at least one tone each comprises means for generating a spectrum of different tones, wherein each of said spectrum of different tones has suppressed energy in bands surrounding 600 Hz, 1800 Hz, and 3000 Hz.

20. A system for identifying and confirming communications between first modem and second modem, comprising:
in said first modem,
first means for using standard V.32/V.32bis interworking methods for identifying said second modem as a V.32/V.32bis modem up and through a standard V.32/V.32bis ranging sequence, and
first means for sending a V.fast identification signal to said second modem after an at least sixteen baud silent time period which occurs after termination of said ranging sequence and before completion of an 8192 baud time period after said at least sixteen baud silent time period, wherein said V.fast identification signal is substantially different from a V.32/V.32bis S signal and first means for detecting a V.fast confirmation signal when said first modem is in an answering mode, and
first means for detecting a V.fast identification signal from said second modem and first means for sending said V.fast confirmation signal to said second modem when said first modem is in a calling mode;
in said second modem, second means for using said standard V.32/V.32bis interworking methods for identifying said first modem as a V.32/V.32bis modem up and through a standard V.32/V.32bis ranging sequence, and
second means for sending a V.fast identification signal to said first modem after an at least sixteen baud silent time period after termination of said ranging sequence and before completion of a 8192 baud time period after said at least sixteen baud silent time period, wherein said V.fast identification signal is substantially different from a V.32/V.32bis S signal and second means for detecting a V.fast confirmation signal when said second modem is in an answering mode, and
second means for detecting a V.fast identification signal from said first modem and second means for sending said V.fast confirmation signal to said first modem when said second modem is; and wherein upon detecting of said V.fast confirmation signal, said first modem and said second modem switch into a V.fast interworking protocol, but if said V.fast confirmation signal is not detected, then said first modem and said second modem continue with said standard V.32/V.32bis interworking methods.

* * * * *